Dec. 5, 1944.　　　G. W. ONKSEN, JR., ET AL　　　2,364,468
SIGNAL LAMP
Filed Nov. 13, 1941　　　3 Sheets-Sheet 1

Inventors
George W. Onksen Jr. &
Clifford C. Duell

By Blackmore, Spencer & Flint
Attorneys

Dec. 5, 1944.　　　G. W. ONKSEN, JR., ET AL　　　2,364,468
SIGNAL LAMP
Filed Nov. 13, 1941　　　3 Sheets-Sheet 2

Inventors
George W. Onksen Jr. &
Clifford C. Duell
By
Blackmor, Spencer & Flint
Attorneys Dec. 5, 1944.  G. W. ONKSEN, JR., ET AL  2,364,468
SIGNAL LAMP
Filed Nov. 13, 1941  3 Sheets—Sheet 3
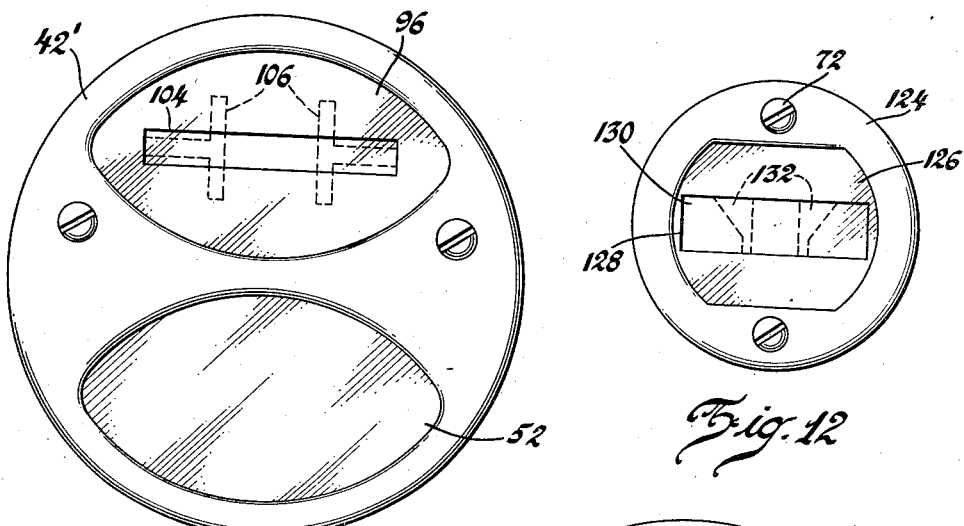
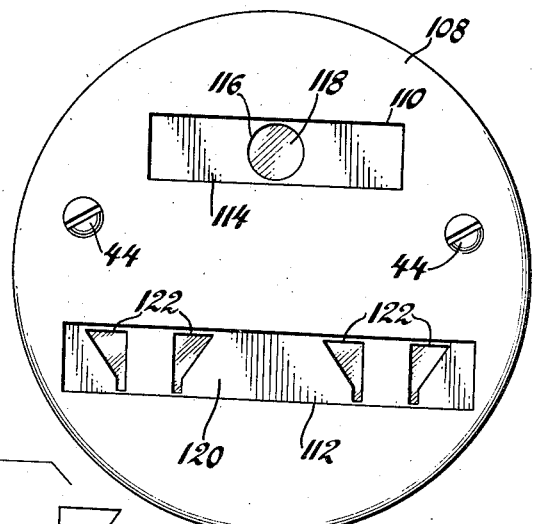
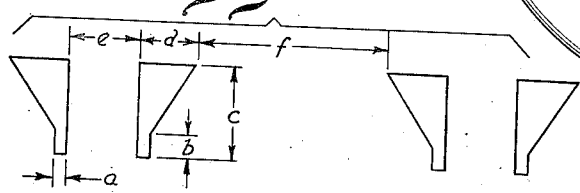
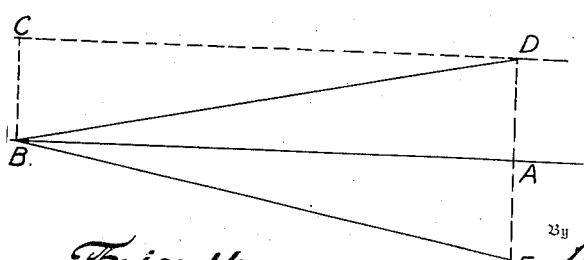
Inventors
George W. Onksen Jr. &
Clifford C. Duell
By
Blackmore, Spencer & Shirt
Attorneys Patented Dec. 5, 1944

2,364,468

UNITED STATES PATENT OFFICE 2,364,468

SIGNAL LAMP

George W. Onksen, Jr., Anderson, Ind., and Clifford C. Duell, Baltimore, Md.; said Onksen, Jr., assignor to General Motors Corporation, Detroit, Mich., a corporation of Delaware Application November 13, 1941, Serial No. 418,898

2 Claims. (Cl. 177—329)

Our invention relates to signal lamps such as are used on military vehicles.

Signal lamps for military vehicles present problems that are not found in ordinary lamp design. The conditions of modern warfare require that a signal lamp be visible at a reasonable distance from the vehicle when the observer is in or somewhere near the plane of operation of that vehicle. The lamp must not, however, be visible from above except within limits too close for the safe operation of aircraft. Likewise, the signal given by the lamp must not be visible at too great an angle to the side. Furthermore, the reduced illumination necessary to prevent observation from above requires that some means be provided for determination of the distance of the observer from the vehicle provided with the signal lamp.

An object of our invention is to provide a signal lamp which gives a signal clearly visible to an observer within a limited distance of the vehicle but not visible to an observer beyond a very limited range above the vehicle. Another object of our invention is to provide a signal light which indicates to an observer how close he is to the light.

More specifically it is an object of our invention to provide a signal light in which the light is transmitted through a restricted channel which limits visibility of the signal to small, rather well-defined angles of observation. Also in our signal lamps we provide adjacent light emitting openings which, together, appear as one light beyond a certain distance from the signal lamp and which appear as two lights within a given distance from the lamp. It is thus possible for an observer to ascertain his proximity to the signal observed, within predetermined ranges.

Figures 8, 9, 10 and 11 are elevation views of modifications of rear signal lamps made according to our invention.

Figure 12 is an elevation view of still another modification of a marker lamp.

Figure 13 is a detail view showing the grouping and spacing of the light openings forming the tail light signal, with representative dimensions, and Figure 14 is a view illustrating the angles of visibility within which observers in various positions may see the signal emitted by a lamp made according to our invention.

Figure 1:
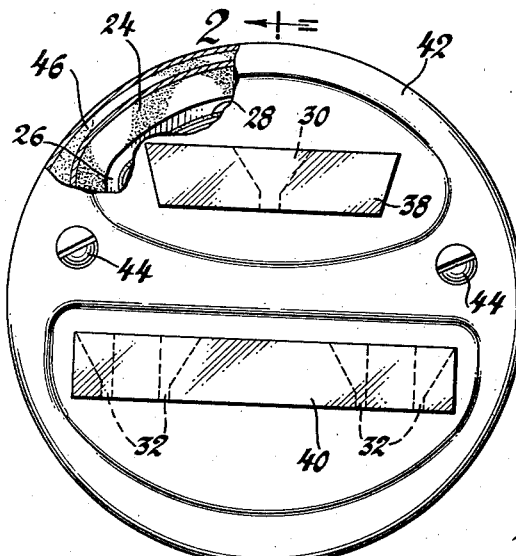
Figure 1 is an elevation view of one of our signal lamps adapted to be used as a rear signal.
Figure 2:
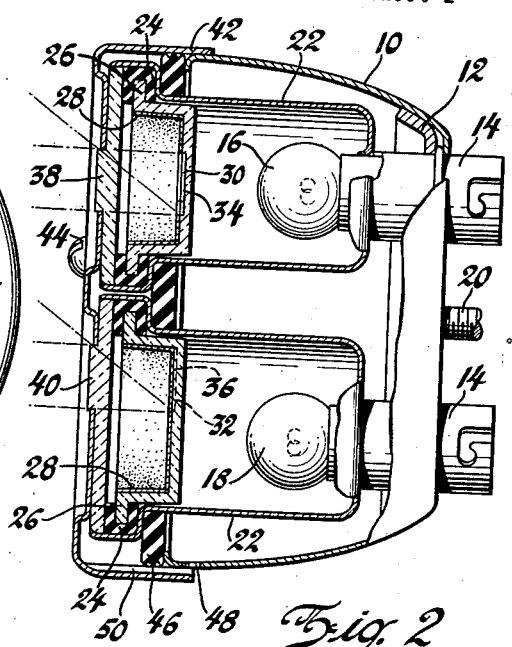
Figure 2 is a view with parts broken away and in section substantially on line 2—2 of Figure 1.

Referring particularly to Figures 1 and 2, 10 indicates a generally cup-shaped casing of any suitable material such as sheet metal which forms a part of the lamp housing. Casing 10 is provided with a reinforced base 12 in which are disposed sockets 14 for bulbs 16 and 18. Base 12 also is provided with a stud or studs 20 to facilitate fastening the signal lamp to the vehicle. Individual shields or compartments 22 are provided for bulbs 16 and 18 to insure against the light of one bulb interfering with the signal of the other. Each of compartments 22 is provided with a gasket 24 of any suitable material such as rubber and having a substantially channel-shaped cross section. Fitting in the end of compartment 22 is filter 26, the flanges of which are held in the channel of gasket 24. This filter is preferably made of a light pervious material such as glass or any of the common molded plastics. The filter may be clear or colored, as desired. The outer face of filter 26 is coated with a light impervious or opaque substance 28, such as black paint. Coating 28 covers the entire surface except for a generally Y-shaped window 30 in the upper filter 26, through which the stop signal light passes and a plurality of similar windows 32 in lower filter 26 through which the tail light signal is emitted. Windows 30 and 32 may be made by masking out the areas of the indentations at the time that coating 28 is sprayed on. Lenses 38 and 40 of any suitable light transmitting material such as Lucite may be provided. These lenses may be held in place by a light impervious cover plate 42 which forms an end wall for casing 10 and completes the lamp housing. Cover plate 42 may be secured to casing 10 by screws 44. Another gasket 46 may be provided to make the assembly substantially dust proof. We have found it desirable to provide a small opening 48 in casing 10 and a small channel 50 at the bottom of cover plate 42 for the purpose of draining any moisture which may condense within the housing or which may possibly leak into the housing from above.

Figure 3:
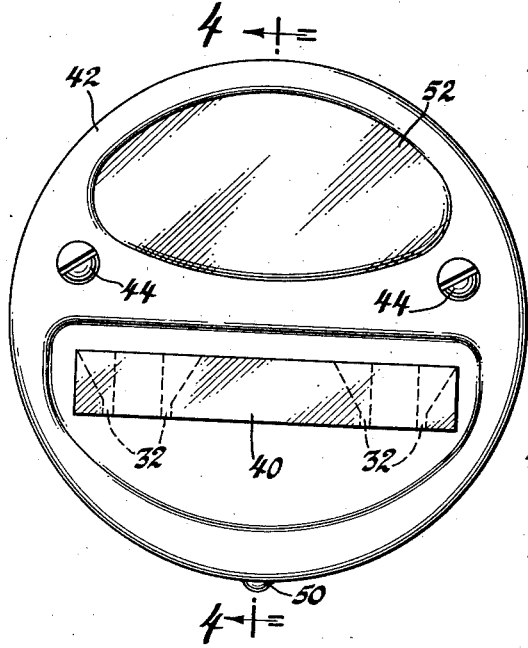
Figure 3 is an elevation view of another signal lamp made according to our invention. This lamp likewise is adapted to be used as a rear signal lamp.
Figure 4:
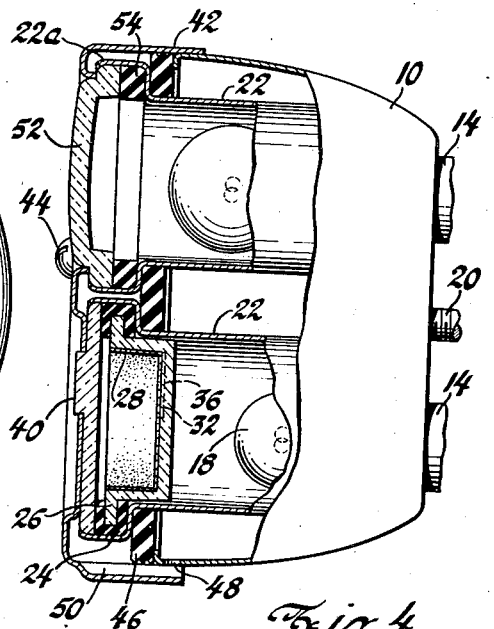
Figure 4 is a view with parts broken away and in section substantially on line 4—4 of Figure 3.

The signal lamp shown in Figures 3 and 4 is similar to that of Figures 1 and 2 in that the tail light portion of the signal comprising the lower assembly is the same. However, in Figures 3 and 4 we provide, instead of the stop light of Figures 1 and 2, a simple lens or glass 52 held in place against gasket 54 by the inwardly turned edges 22a of compartment 22, and also by cover 42. Lens 52 may be transparent or translucent and it may be clear or colored as desired. The structural features of the housings shown in Figures 1 to 4 form no part of this invention, but are claimed in the co-pending application of Robert N. Falge, Signal lamp, Serial No. 418,895, filed November 13, 1941.

Figure 5:
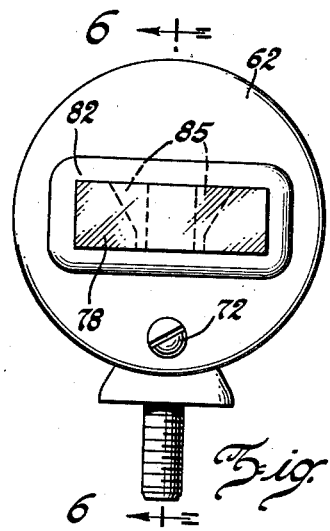
Figure 5 is an elevation view of a marker lamp made according to our invention and adapted to be used as a front signal lamp.
Figure 6:
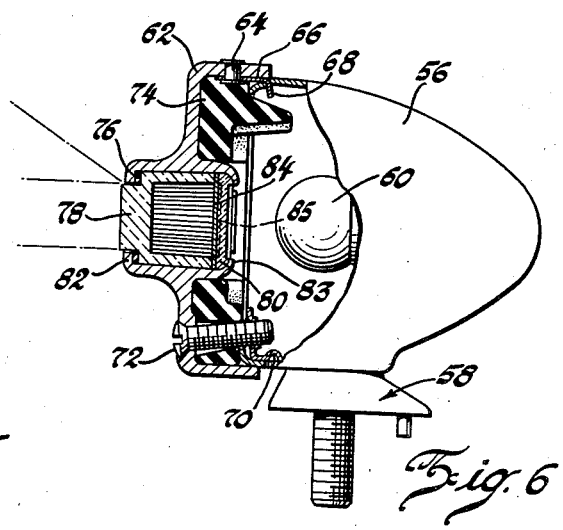
Figure 6 is a view of the lamp of Figure 5 with parts broken away and in section substantially on line 6—6.

In Figures 5 and 6 we have shown a marker lamp having a casing 56 provided with a suitable mounting base 58. A light bulb 60 is disposed in casing 56. A cap or cover plate 62 completes the lamp housing. It has secured thereto, as by a rivet 64, a bracket 66, the inwardly turned end of which engages a recess, such as a notch or slot 68 near the edge at the top of casing 56. A bracket 70 is secured to the bottom of casing 56; this bracket is threaded and is engaged by screw 72 which extends through cover plate 62 to hold the cover in place. A gasket 74 is disposed between cover 62 and casing 56. Cover 62 is provided substantially centrally thereof with an extended aperture or walled opening in which are disposed gasket 76, lens 78 of a light pervious material such as Lucite, and a filter 80. Gasket 76, lens 78 and filter 80 are held in place in the compartment formed by this walled opening between inwardly turned flanges 82 and 83 of the opening through cover plate 62. Here also filter 80 is coated with an opaque substance 84 such as black paint except for generally Y-shaped windows 85 which permit the transmission of light through filter 80. The structural features of the housing shown in Figures 5 and 6 form no part of this invention, but are claimed in the copending application of John H. Diedring, Signal lamp, Serial No. 418,897, filed November 13, 1941.

Figure 7:
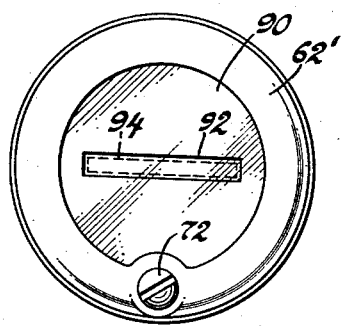
Figure 7 is an elevation view of a modification of a marker lamp.

In Figure 7 we have illustrated a modified type of marker. In this modification a clear transparent lens 90 is held in place by cover plate 62'. A light impervious screen or plate having a window 92 is disposed back of lens 90. Window 92 may take the form of an elongated slot as shown. Spaced from the light impervious plate is a second plate or disk of light impervious material in which is provided a window 94. Window 94 is aligned with window 92 and the light source, and is preferably smaller than window 92.

Figure 8:
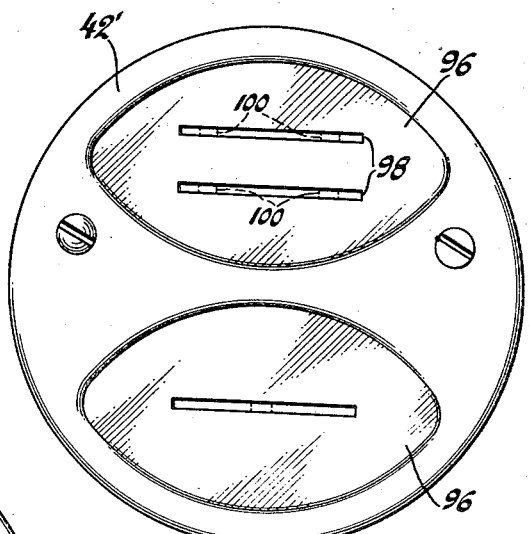

In the modified signal lamp of Figure 8, transparent lenses 96 are held in place by cover plate 42'. In the upper half or tail light part of the signal a light impervious screen or plate having two elongated slots 98 is disposed. Spaced from this light impervious screen is still another light impervious screen having windows 100. The construction of the lower half or stop light portion of the signal of Figure 8 is similar to that of the tail light portion except that only one window is provided in each opaque screen.

Figure 9:
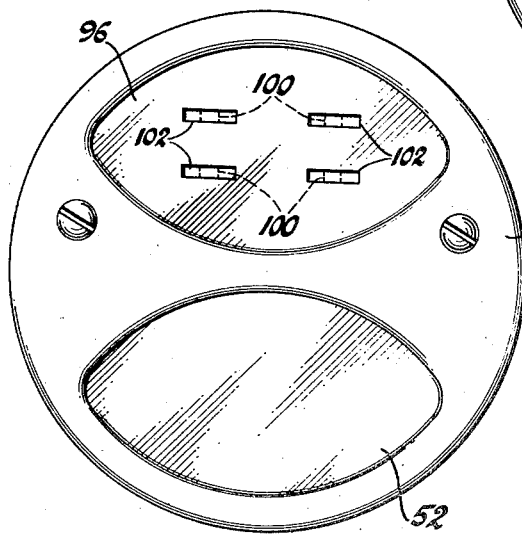

In the modification of Figure 9, in the tail light portion a transparent lens 96 is held in place by cover plate 42' as in Figure 8. However, the first light impervious plate has four shorter slots or windows 102 instead of the two long slots 98 of Figure 8. As in the lamp of Figure 8, a second light impervious plate spaced from the first has four small windows 100 aligned with windows 102. Windows 100, however, are smaller than windows 102. The stop light portion of the lamp in Figure 9 may be similar to that shown in Figures 3 and 4.

In the modification of Figure 10 a transparent lens 96 is held in place by cover plate 42' as before. The first opaque screen has one long slot or window 104. Spaced from this screen is a second screen having two T-shaped slots or windows 106 through which light may pass from the light source directly or through a colored filter. The stop light portion of signal lamp 10 may be similar to that of Figures 3 and 4.

In the modification of Figure 11 we have provided a light impervious cover plate 108 secured by screws 44. Cover plate 108 is provided with slots forming windows 110 and 112. In the stop light portion of the lamp of Figure 11 a second light impervious plate or screen 114 is spaced from cover plate 108. Screen 114 is provided with a window 116 to which light is admitted from a filter 118 which may be colorless or colored.

In the tail light portion of Figure 11 a second light impervious screen 120 is spaced from cover plate 108. Screen 120 is provided with two pairs of generally Y-shaped windows 122 through which light may be admitted from a colored filter disposed between screen 120 and the light source.

In the marker lamp modification shown in Figure 12, a cover plate 124 is held in place by screws 72. Cover plate 124 holds a transparent lens 126 in place. A light impervious screen having an elongated slot or window 128 is disposed behind lens 126. Back of this, still another light impervious screen 130 is located. In screen 130 we provide a pair of generally Y-shaped openings or windows 132.

In the application of our invention to a signal lamp such as a combination tail and stop light shown in Figures 1 and 2, the windows 32 serve as a tail light and window 30 as a stop signal. It will be found that an observer beyond a predetermined distance from the lamp will see the light emitted through windows 32 as though it came from a single window or source instead of from four. As the observer approaches the signal lamp to a distance just within the first named predetermined distance but beyond a second predetermined distance less than the first, the single light source appears to divide in two, each of which is made up of two closely spaced windows 32 as seen in Figure 1. As the observer continues to approach the signal, and does so to a point within the second predetermined distance, he sees four separate light sources.

It is thus evident that we have provided a signal lamp which makes it possible for an observer to determine within rather definite ranges what his proximity to the signal is. We have found the following distances satisfactory: four separate sources discernible up to 50-60 feet from the lamp; two sources from there to 150-180 feet; and one light source beyond 180 feet from the signal. In Fig. 13 we have shown a detail view of the tail lamp section of our signal lamp, indicating the grouping and spacing which we have developed to give the above described ranges. The dimensions and spacing for the above ranges are the following:

$a = 5/64$ inch
$b = 1/8$ inch
$c = 1/2$ inch
$d = 5/16$ inch
$e = 3/8$ inch and $f = 1$ inch The distance from the front of lens 40 to the front of window 32 for these ranges was 3/4 inch. Filter 26 was made of commercial Tenite II, and a 3 candle power bulb 18 was used, the tip of which was located approximately $1/16$ inch from filter 26. It will, of course, be understood that the above visibility ranges may be varied by varying the spacing or size of the windows, or the intensity of the light admitted to these windows, or any combination of these three.

It may also be seen from the drawings how we have solved the problem of restricting visibility of the emitted signal to a predetermined angular range. Lenses 38 and 40 protrude through openings in cover plate 42, and provide windows. A second set of restrictive windows is aligned with the first set and is spaced therefrom; these are windows 30 and 32. It is obvious that the light transmitted through windows 30 and 32 will be visible to an observer precisely aligned with these windows and with the windows formed by lenses 38 and 40 respectively; the light thus transmitted will also be visible to an observer slightly off to one side, or above or below, a line representing a center line of, or an optical axis through, windows 30 and 38, or windows 32 and 40. However, as the observer's vantage point moves farther and farther from this imaginary center line, vertically or horizontally, he will eventually reach a point at which the edge of window 38 or 40 will cut off the light from window 30 or windows 32, respectively. This cut-off is assisted by the expedient of making one set of windows smaller than the aligned set. Visibility of the signals to observers in aircraft is further restricted by the provision of wedge or Y-shaped windows, as shown at 30 and 32, with the narrow part of the window at the bottom, so that vertical cut-off begins by cutting out the broad strip of light first, leaving only the narrow part, which is less intense and therefore less easily seen, as the angle above the horizontal increases. Satisfactory results have been obtained with signals having windows of the dimensions outlined above.

Fig. 14 is a diagram showing how the vertical cut-offs or visibility limits may be ascertained. Line A—B represents the ground line of travel on a level road; line C—D represents the minimum altitude for the safe operation of aircraft, which is here taken as approximately 400 feet. Now, it is possible for vehicles of the type here involved to operate downhill on a 20% slope, or about 11⅓°. This line of travel is represented by line D—B. With the vehicle at point B and on the slope D—B, it is evident that the signal must not be visible to an observer above line C—D. This condition, then, fixes the vertical cut-off.

It is also possible for these vehicles to operate uphill on a 20% slope, represented by line E—B. If the leading vehicle is descending along slope D—B, and the following vehicle is ascending along slope E—B, and the leading vehicle is near the crest so that the hill-top does not block the line of sight, it is evident that the tail light of the leading vehicle must be visible to an observer at an angle DBE below the longitudinal axis of the vehicle.

The operation, or effect upon an observer, of the signal lamps shown in Figs. 5 to 12 is substantially the same as that of the lamps shown in Figs. 1 to 4, which is described in detail above. It may be pointed out here that, inasmuch as the front markers shown in Figs. 5, 6 and 12 have only two windows, instead of four as in the tail lamps of Figs. 1 to 4, the effects obtainable are necessarily limited. With front markers such as shown in Figs. 5 and 6, we have obtained satisfactory results by spacing windows 85 so that two lights are visible up to 50-60 feet, but beyond that distance these two lights appear as one. It is evident, of course, that the signal windows of the lamp shown in Figures 5 and 6 are merely one half of the windows of the lamps in Figures 1-4.

We claim:

1. In combination, an opaque housing, a light therein, a window in one wall of said housing, an opaque screen between the light and the window and spaced from the window, and a wedge-shaped window in the screen, the wide part of said wedge-shaped window being at the top, whereby visibility of the light leaving the housing is restricted to a determinable angle from the horizontal.

2. In combination, a lamp casing having one wall thereof provided with a relatively narrow, horizontal window, a light source in said casing, an opaque screen between said light source and said window and spaced from said window, and a relatively restricted window in said screen, said screen window extending vertically and of less width adjacent its lower end than adjacent its upper end, and said windows being substantially horizontally aligned whereby visibility of the light rays passing through said windows is restricted to a relatively narrow vertical range.

GEORGE W. ONKSEN, Jr.
CLIFFORD C. DUELL.